US012682559B2

(12) United States Patent
Gold et al.

(10) Patent No.: US 12,682,559 B2
(45) Date of Patent: Jul. 14, 2026

(54) ANALYTICS DISPLAY INDICATIVE OF USER INTERACTION WITH A 3D ENVIRONMENT, USING GAZE DATA AND A HEATMAP THEREFROM

(71) Applicant: Aircards Ltd, Newcastle Upon Tyne (GB)

(72) Inventors: Adin Gold, Philadelphia, PA (US); Kristian Zadlo, Chicago, IL (US)

(73) Assignee: AIRCARDS LTD, Newcastle Upon Tyne (GB)

( * ) Notice: Subject to any disclaimer, the term of this patent is extended or adjusted under 35 U.S.C. 154(b) by 157 days.

(21) Appl. No.: 18/390,073

(22) Filed: Dec. 20, 2023

(65) Prior Publication Data

US 2025/0209735 A1     Jun. 26, 2025

(51) Int. Cl.
G06T 17/00         (2006.01)
G06F 3/01          (2006.01)
G06T 7/80          (2017.01)

(52) U.S. Cl.
CPC .............. G06T 17/00 (2013.01); G06F 3/013 (2013.01); G06T 7/80 (2017.01)

(58) Field of Classification Search
CPC .............................. G06T 17/00; G06T 19/006
See application file for complete search history.

(56) References Cited

U.S. PATENT DOCUMENTS

2017/0206707 A1 *  7/2017  Guay ....................... H03M 7/30
2024/0265640 A1 *  8/2024  Lensvelt .............. G06T 19/006

* cited by examiner

*Primary Examiner* — Shivang I Patel
(74) *Attorney, Agent, or Firm* — Barclay Damon LLP; Daniel McGrath

(57)          ABSTRACT

A system for generating an analytics display indicative of user interaction with a common 3D environment. A first computer system runs a data processing module. The data processing module is configured to control the first computer system to: receive gaze data indicative of surface locations within the common 3D environment rendered on a plurality of user devices; periodically generate heatmap data from the gaze data including plurality of heatmap points corresponding to surface locations within the common 3D environment and weighted corresponding to a frequency with which users direct their gaze at the corresponding surface location, and communicate the heatmap data to a further computing device with a display, whereupon, a display rendering function is configured to render on the display the heatmap data as a 3D heatmap superimposed on a representation of the common 3D environment, thereby generating a 3D interactive display.

36 Claims, 9 Drawing Sheets

Data Logging Algorithm

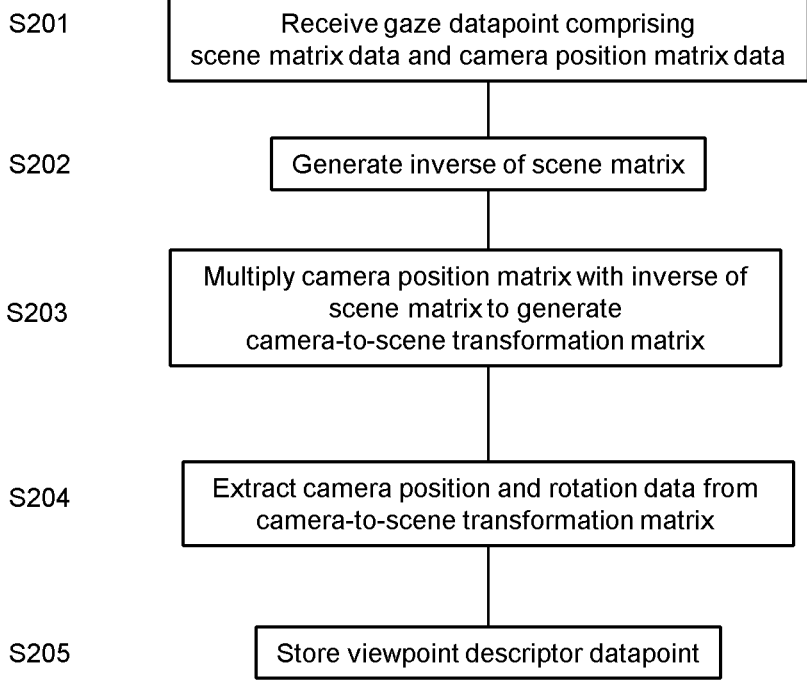

S201     Receive gaze datapoint comprising scene matrix data and camera position matrix data S202     Generate inverse of scene matrix S203     Multiply camera position matrix with inverse of scene matrix to generate camera-to-scene transformation matrix S204     Extract camera position and rotation data from camera-to-scene transformation matrix S205     Store viewpoint descriptor datapoint

Fig 2

Heatmap Generating Algorithm

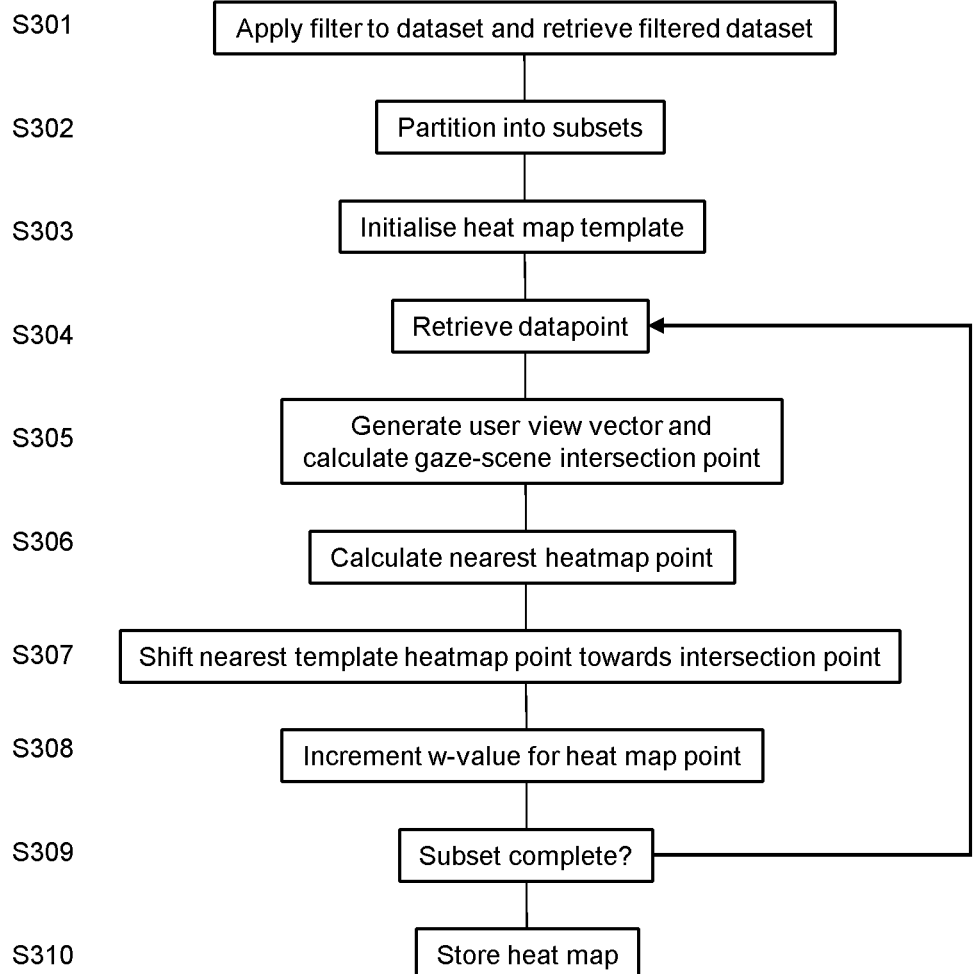

S301     Apply filter to dataset and retrieve filtered dataset

S302     Partition into subsets

S303     Initialise heat map template

S304     Retrieve datapoint

S305     Generate user view vector and calculate gaze-scene intersection point

S306     Calculate nearest heatmap point

S307     Shift nearest template heatmap point towards intersection point

S308     Increment w-value for heat map point

S309     Subset complete?

S310     Store heat map

Fig 3

Heat Map Merging Algorithm

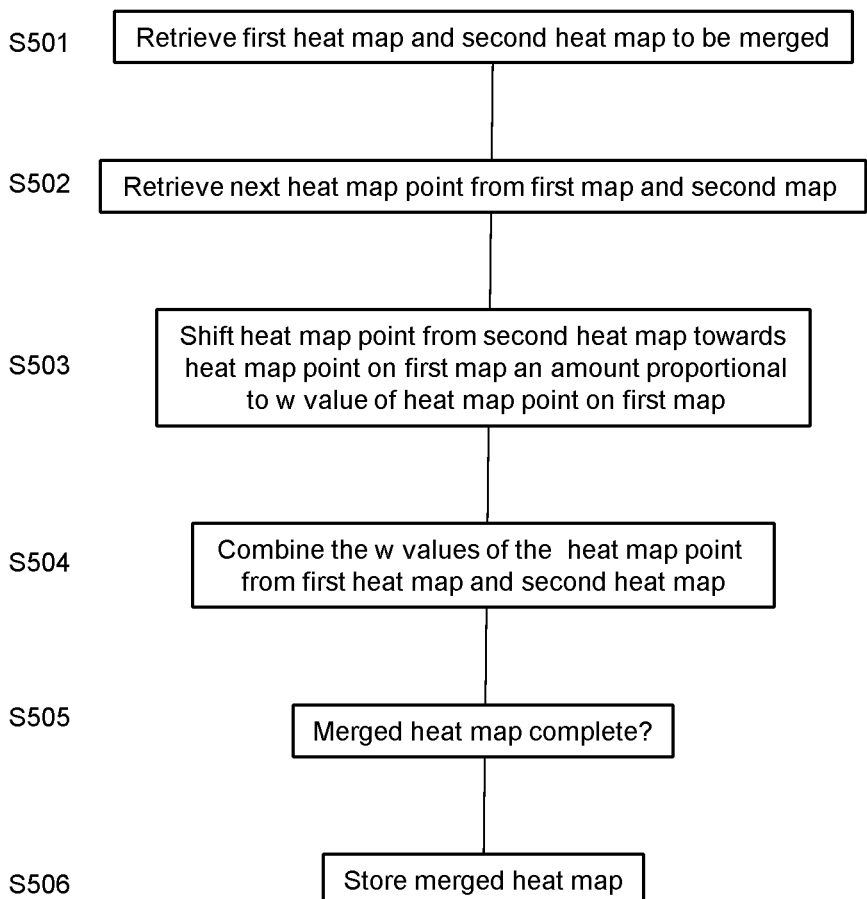

S501          Retrieve first heat map and second heat map to be merged

S502          Retrieve next heat map point from first map and second map

S503          Shift heat map point from second heat map towards heat map point on first map an amount proportional to w value of heat map point on first map S504          Combine the w values of the  heat map point from first heat map and second heat map S505          Merged heat map complete?

S506          Store merged heat map

Fig 5

Position Pin Generating Algorithm

S601          Determine pin size

S602          Generate set of positional data

S603          Retrieve positional data point

S604          Compare with sorted data points

S605          Position exist?

S606          Sort and store data point

S607          Increment w value of existing data point

S608          All data points processed?

S609          Generate mesh of Pins

ANALYTICS DISPLAY INDICATIVE OF USER INTERACTION WITH A 3D ENVIRONMENT, USING GAZE DATA AND A HEATMAP THEREFROM

TECHNICAL FIELD

The present invention relates to techniques for generating an analytics display.

BACKGROUND

Advances in software and hardware technology have enabled web browsers running on mobile devices, such as smartphones and tablets, to support advanced 3D rendering.

One example are so-called 3D experiences provided by, for example, companies when launching a new product or service. In such an example, a user might be sent a link to their device or access a link by capturing a QR code or similar, which then directs a browser a browser running on the device to an interactive 3D-rendered microsite containing branded content with which the user can interact by, for example "looking at" and engaging with a 3D representation of a new product such as, for example, a new car.

This technology allows, for example, marketing companies to provide a new and interesting way for to market products to consumers. However, as opposed to conventional advertising, useful additional information can be derived from the way in which users interact with such 3D experiences. For example, "engagement" can be assessed by analysing the way in which a user interacts with particular elements within the 3D environment. For example, it may be possible to determine how interesting or engaging a new product design is by analysing how users interact with a representation of such a product design in the 3D environment.

However, finding a way to capture this information and then usefully present it back to a developer of a 3D experience is a challenge.

SUMMARY OF THE INVENTION

In accordance with a first aspect of the invention, there is provided a method of generating an analytics display indicative of user interaction with a 3D environment. The method comprises: receiving gaze data indicative of surface locations within a common 3D environment rendered on a plurality of user devices, said gaze data indicative of where users direct their gaze within the 3D environment; periodically generating heatmap data from the gaze data, said heatmap data comprising a plurality of heatmap points corresponding to surface locations within the 3D environment, each heatmap point weighted corresponding to a frequency with which users direct their gaze at the surface location to which the heatmap point corresponds; communicating the heatmap data to a further device, and rendering at the further device the heatmap data as a 3D heatmap superimposed on a representation of the 3D environment, thereby generating a 3D interactive display indicative of the surface locations within the 3D environment at which the users most commonly direct their gaze.

Optionally, the gaze data comprises a plurality of gaze datapoints, each gaze datapoint indicative of a surface location within the common 3D environment at which a user has directed their gaze during a sample period.

Optionally, generating the heatmap data comprises: processing the gaze data to calculate a plurality of intersection points indicative of where a user gaze intersects with a surface of the 3D environment;

transforming, in accordance with positions of the plurality of intersection points, a heatmap template comprising a plurality of heatmap points representative of the surface of the 3D environment and initially distributed in accordance with an initial distribution pattern, and generating the heatmap data from the transformed heatmap template.

Optionally, the initial distribution pattern comprises a substantially even distribution of the plurality of heatmap points across the surface of the 3D environment.

Optionally, a number of heatmap points is a predetermined number of heatmap points set independently of properties of the surface of the 3D environment.

Optionally, transforming the heatmap template in accordance with the positions of the plurality of intersection points comprises sequentially, for each intersection point: identifying a heatmap point of the heatmap template which most closely matches the position of the intersection point, and incrementing a weighting value of the identified heatmap point.

Optionally, transforming the heatmap template in accordance with the positions of the plurality of intersection points further comprises sequentially, for each intersection point: modifying the location of the identified heatmap point to match more closely the location of the intersection point.

Optionally, each gaze datapoint comprises scene matrix data indicative of a position, rotation and scale of the 3D environment relative to a world reference frame, and camera matrix data indicative of a position, rotation and scale of a user view relative to the world reference frame, wherein calculating the plurality of intersection points comprises, for each gaze datapoint: multiplying the camera matrix data with an inverse of the scene matrix data to obtain a camera-relative-to-scene matrix indicative of a position, rotation and scale of the users view relative to the scene; extracting from the camera-relative-to-scene matrix camera position coordinates and camera rotation coordinates; generating from the camera position coordinates and camera rotation coordinates, a user view vector; and calculating an intersection point from the user view vector and a representation of the 3D environment.

Optionally, periodically generating heatmap data from the gaze data comprises: generating a first set of heatmap data from a first set of gaze data; generating one or more further sets of heatmap data from one or more further sets of gaze data; merging the first set of heatmap data and one or more further sets of heatmap data to produce merged heatmap data, and the heatmap data communicated to the further device is the merged heatmap data.

Optionally, the first set of gaze data and the one or more further sets of gaze data each comprise a predetermined maximum number of gaze datapoints.

Optionally, the method further comprises: filtering the gaze data in accordance with a filtering criteria, and periodically generating the heatmap data from the filtered gaze data.

Optionally, the filtering criteria is one or more of a user device characteristic criteria associated with one or more characteristics of a user device from which the gaze data was received, and a temporal criteria associated with a point in time when the gaze data was received.

Optionally, the gaze data is received from a logger script running on a system serving 3D data to the user devices for displaying the 3D environment.

Optionally, the heatmap data is communicated to the further device as web data to be rendered on the further device by web browser software running on the further device.

Optionally, rendering the heatmap data at the further device comprises: displaying each heatmap point with a visual property dependent on its weighting.

Optionally, the visual property is shading intensity.

Optionally, the gaze data is further indicative of locations within the 3D environment where users have paused, and said method further comprises: periodically generating pin map data indicative of locations where users have most commonly paused; communicating the pin map data to the further device, and further rendering the pin map data at the further device as a 3D map of distributed graphical pins superimposed on the representation of the 3D environment, thereby generating a 3D interactive display indicative of the locations within the 3D environment at which users most commonly pause.

Optionally, the gaze data is further indicative of a path traversed by the users within the 3D environment, said method further comprising: communicating the gaze data associated with the path traversed by a selected user to the further device, and rendering a representation of the path at the further device.

Optionally, the method further comprises: receiving ancillary data associated with characteristics of the plurality of users devices and users of the plurality of user devices; communicating the ancillary data to the further device, and displaying metric data associated the ancillary data at the further device.

Optionally, the method further comprises: receiving entity selection data at the further device identifying an entity within the 3D environment, and further selectively rendering parts of the heatmap data associated with identified entity superimposed on a representation of the entity thereby generating a further 3D interactive display indicative of surface locations of the entity at which the users most commonly direct their gaze.

In accordance with a second aspect of the invention, there is provided a system for generating an analytics display indicative of user interaction with a common 3D environment, said system comprising a first computer system on which is running a data processing module and a further computing device comprising a display, wherein said data processing module is configured to control the first computer system to: receive gaze data indicative of surface locations within the common 3D environment rendered on a plurality of user devices, said gaze data indicative of where users of the plurality of user devices direct their gaze within the common 3D environment; periodically generate heatmap data from the gaze data, said heatmap data comprising a plurality of heatmap points corresponding to surface locations within the common 3D environment, each heatmap point weighted corresponding to a frequency with which users direct their gaze at the surface location to which the heatmap point corresponds, and communicate the heatmap data to the further device, whereupon, a display rendering function running on the further computer device is configured to render on the display the heatmap data as a 3D heatmap superimposed on a representation of the common 3D environment, thereby generating a 3D interactive display indicative of the surface locations within the common 3D environment at which the users most commonly direct their gaze.

Optionally, the gaze data comprises a plurality of gaze datapoints, each gaze datapoint indicative of a surface location within the common 3D environment at which a user has directed their gaze during a sample period.

Optionally, the data processing module is configured to control the first computer system to generate the heatmap data by: processing the gaze data to calculate a plurality of intersection points indicative of where a user gaze intersects with a surface of the 3D environment; transforming, in accordance with positions of the plurality of intersection points, a heatmap template comprising a plurality of heatmap points representative of the surface of the 3D environment and initially distributed in accordance with an initial distribution pattern, and generating the heatmap data from the transformed heatmap template.

Optionally, the initial distribution pattern comprises a substantially even distribution of the plurality of heatmap points across the surface of the 3D environment.

Optionally, a number of heatmap points is a predetermined number of heatmap points set independently of properties of the surface of the 3D environment.

Optionally, the data processing module is configured to control the first computer system to transform the heatmap template in accordance with the positions of the plurality of intersection points by sequentially, for each intersection point: identifying a heatmap point of the heatmap template which most closely matches the position of the intersection point and incrementing a weighting value of the identified heatmap point.

Optionally, transforming the heatmap template in accordance with the positions of the plurality of intersection points further comprises sequentially, for each intersection point: modifying the location of the identified heatmap point to match more closely the location of the intersection point.

Optionally, each gaze datapoint comprises scene matrix data indicative of a position, rotation and scale of the 3D environment relative to a world reference frame, and camera matrix data indicative of a position, rotation and scale of a user view relative to the world reference frame, wherein the data processing module is configured to control the first computer system to calculate the plurality of intersection points by, for each gaze datapoint: multiplying the camera matrix data with an inverse of the scene matrix data to obtain a camera-relative-to-scene matrix indicative of a position, rotation and scale of the users view relative to the scene; extracting from the camera-relative-to-scene matrix camera position coordinates and camera rotation coordinates; generating from the camera position coordinates and camera rotation coordinates, a user view vector, and calculating an intersection point from the user view vector and a representation of the 3D environment.

Optionally, the data processing module is configured to control the first computer system to periodically generate heatmap data from the gaze data by: generating a first set of heatmap data from a first set of gaze data; generating one or more further sets of heatmap data from one or more further sets of gaze data; merging the first set of heatmap data and one or more further sets of heatmap data to produce merged heatmap data, and the heatmap data communicated to the further device is the merged heatmap data.

Optionally, the first set of gaze data and the one or more further sets of gaze data each comprise a predetermined maximum number of gaze datapoints.

Optionally, the data processing module is further configured to control the first computer system to: filter the gaze data in accordance with a filtering criteria, and periodically generate the heatmap data from the filtered gaze data.

Optionally, the filtering criteria is one or more of a user device characteristic criteria associated with one or more characteristics of a user device from which the gaze data was received, and a temporal criteria associated with a point in time when the gaze data was received.

Optionally, the first computer system is configured to receive the gaze data from a logger script running on a system serving 3D data to the user devices for displaying the 3D environment.

Optionally, the first computer system has running thereon a web server application configured to communicate the heatmap data to the further device as web data to be rendered on the further device by web browser software running on the further device.

Optionally, rendering at the further device the heatmap data comprises displaying each heatmap point with a visual property dependent on its weighting.

Optionally, the visual property is shading intensity.

Optionally, the gaze data is further indicative of locations within the 3D environment where users have paused, and said data processing module is further configured to control the first computer system to: periodically generate pin map data indicative of locations where users have most commonly paused; communicate the pin map data to the further device, and the further device is configured to further render the pin map data as a 3D map of distributed graphical pins superimposed on the representation of the 3D environment, thereby generating a 3D interactive display indicative of the locations within the 3D environment at which users most commonly pause.

Optionally, the gaze data is further indicative of a path traversed by the users within the 3D environment, wherein the data processing module is configured to control the first computer system to: communicate the gaze data associated with the path traversed by a selected user to the further device, and responsive to which said further device is configured to render a representation of the path.

Optionally, the first computing system is configured to further receive ancillary data associated with characteristics of the plurality of users devices and users of the plurality of user devices, and the data processing module is configured to control the first computer system to communicate the ancillary data to the further device, whereupon, the further device is configured to display metric data associated the ancillary data on the display.

In accordance with a third aspect of the invention, there is provided a computer program which when run on a computing device, controls the computing device to perform a method comprising the steps of: receiving gaze data indicative of surface locations within a common 3D environment rendered on a plurality of user devices, said gaze data indicative of where users direct their gaze within the 3D environment; periodically generating heatmap data from the gaze data, said heatmap data comprising a plurality of heatmap points corresponding to surface locations within the 3D environment, each heatmap point weighted corresponding to a frequency with which users direct their gaze at the surface location to which the heatmap point corresponds, and communicating the heatmap data to a further device, such that the heatmap data can be rendered at the further device as a 3D heatmap superimposed on a representation of the 3D environment, thereby generating a 3D interactive display indicative of the surface locations within the 3D environment at which the users most commonly direct their gaze.

Various further features and aspects of the invention are defined in the claims.

BRIEF DESCRIPTION OF THE DRAWINGS

Embodiments of the present invention will now be described by way of example only with reference to the accompanying drawings where like parts are provided with corresponding reference numerals and in which:

FIG. 2 provides a diagram showing steps of a data logging algorithm in accordance with certain embodiments of the invention;

FIG. 3 provides a diagram showing the steps of a heatmap generating algorithm in accordance with certain embodiments of the invention;

FIG. 5 provides a diagram depicting steps of a heatmap merging algorithm in accordance with certain embodiments of the invention;

DETAILED DESCRIPTION

Figure 1:
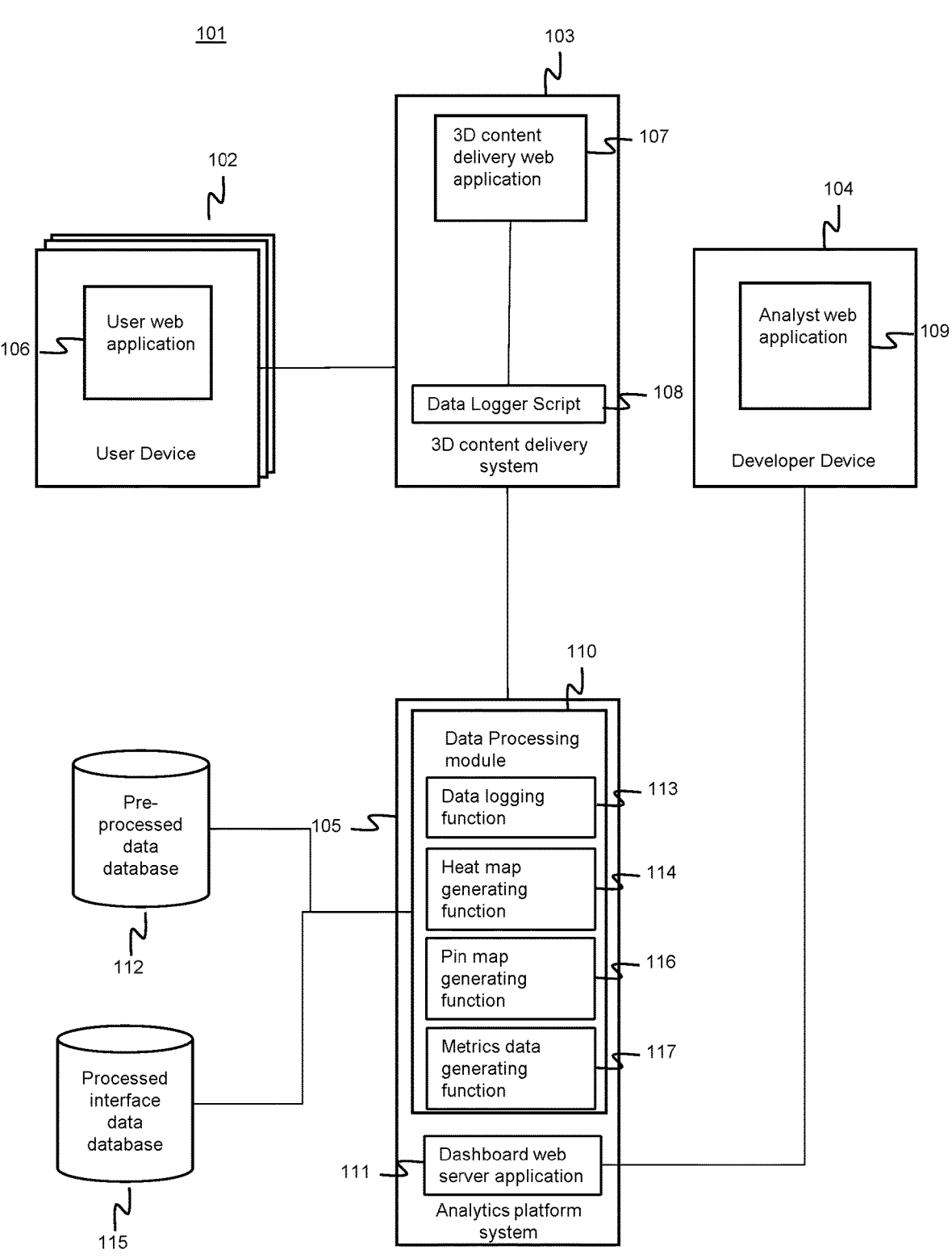
FIG. 1 provides a simplified schematic diagram depicting a system for generating an interface to show a heatmap in accordance with certain embodiments of the invention.

FIG. 1 provides a simplified schematic diagram of a system 101 for collecting and processing data associated with the way in which various users interact with an immersive 3D experience, in which a 3D environment is rendered on their device. The system then facilitates generation and display of an analytics display in the form of an intuitive graphical interface enabling this data to be analysed in the form of a 3D heatmap.

The system comprises a plurality of user devices 102 connected to a 3D content delivery system 103. The 3D content delivery system 103 is further connected to an analytics platform 105 which is connected to an analyst device 104 and a pre-processed data database 112.

Each user device of the plurality of user devices 102 has running thereon a user web application 106. The 3D content delivery system 103 has running thereon software providing a 3D content delivery web application 107 and a data logger script 108. The analytics platform 105 has running thereon software providing a data processing module 110 and a dashboard web server application 111 and the analyst device 104 has running thereon an analyst web application 109.

The data processing module 110 comprises a data logging function 113 and a heatmap generating function 114. In certain embodiments, the data processing module 110 also comprises a pin map generating function 116 and a metrics generating function 117.

In use, the 3D content delivery web application 107 is configured to serve web data to the user web application 106 of each user device providing 3D data. The user web application 106 is configured to render this 3D data and display it to a user so that the user can interact with a 3D environment. This is a common 3D environment in the sense that it is the same 3D environment rendered on each user device.

As well as rendering the 3D data and enabling a user to interact with the 3D environment, the user web application 106 is configured to generate user 3D navigation data, indicative of how the user interacts with the 3D environment including, in particular positional metrics indicative of a "camera position" and "camera rotation" as the user interacts with (navigates around) the 3D environment. As will be understood, "camera position" corresponds to a position within the 3D environment (e.g. defined by x, y, and z coordinates), and the camera rotation defines a given field of view of the user from that position (e.g. defined by pitch, yaw and roll angles)

The user web application 106 of each user device communicates the user 3D navigation data from the user device 102 to the 3D content delivery web application 107 enabling the manner in which users move around the 3D environment to be tracked. Typically, ancillary data, associated the user device can also be communicated such as geolocation, device type and, if available, user profile information such as user age, gender and so on.

The data logger script 108 is configured to request and receive "gaze data" from the 3D content delivery web application 107. This gaze data is data derived from the user 3D navigation data and is indicative of surface locations within the 3D environment where users direct their gaze.

Typically, the gaze data comprises a plurality of gaze datapoints. Each gaze datapoint comprises scene matrix data and camera position matrix data corresponding to the view of the 3D environment rendered on a user device during a particular sample period.

The gaze data may also be accompanied by session identifier data identifying a 'user session' to which the gaze data relates. A user session is a distinct period of interaction between a user and the 3D environment, marked by unique identification from start to finish. Typically, a user session begins when the user initiates interaction with the environment, such as launching the application or activating a specific feature and ends when the user exits the application or ceases interaction with the environment.

As will be explained in more detail below, the session identifier data enables gaze data from specific user sessions to be analysed.

As the skilled person will understand, the scene matrix data is indicative of a position, rotation, and scale of the 3D environment relative to a "world" reference frame, and the camera position matrix data is indicative of a position, rotation and scale of a user view relative to the "world" reference frame.

As the skilled person will understand, it is common for 3D content delivery web application 107 to include functions via which such scene matrix data and camera position matrix data can be retrieved.

The data logger is also configured to request and receive from the 3D content delivery web application 107 the ancillary data. This is done in such a way that specific gaze datapoints are linked with the corresponding user data of the user device that generated the user 3D navigation data from which the gaze datapoints are derived. As described in more detail below, this enables filtering operations to be performed whereby heatmaps are generated in respect of gaze data from user devices with certain characteristics such as geolocations.

The gaze data, session identifier data and ancillary data, retrieved by the data logger script 108 is communicated from the 3D content delivery system 103 to the analytics platform 105.

Functionality running on the data processing module 110 is configured to perform initial preprocessing on this data and then store it in the pre-processed data database 112.

Subsequently, further functionality running on the data processing module 110 is configured to retrieve the pre-processed data and perform further processing on it to generate data for display on an interface displayed on the analyst device 104. This processed data is then stored in the processed interface data database 115.

As is explained in more detailed below, this further processing involves generating heatmap data and pin map data indicative of the manner in which users interact with the 3D environment.

In particular, the heatmap data can be used to render a "gaze heatmap" which, via different intensities of shading, indicates surface locations within a 3D environment at which users most frequently direct their gaze. Similarly, the pin map data can be used to render a "pin map" showing different positions within the 3D environment where users most frequently pause.

Web data providing an interface is communicated by the dashboard web server application 111 to the analyst web application 109 running on the analyst device 104, enabling, using a conventional display rendering function, the heatmap data and pin map data to be rendered and interacted with, via a 3D interactive display, by a user of the analyst device 104 (normally an analyst associated with the developer of the 3D immersive experience provided by the 3D content delivery system 103). In particular, the heatmap data and pin map data rendered as a gaze heatmap and pin map respectively can be superimposed on a render of the 3D environment which provides a visually intuitive representation of which aspects and elements of the 3D environment users are most frequently looking at and where they most frequently stand.

Typically, during a configuration phase, an analyst associated with the 3D content delivery system 103 and the 3D content delivery web application 107 installs the data logger script 108 onto the 3D content delivery system 103. After this, the analyst accesses a settings panel via the dashboard web server application 111 through the analyst web application 109. Here, the analyst can adjust various system settings. These systems settings can include settings such as specifying the type of ancillary data to be collected, filter data specifying certain user characteristics and/or user device characteristics, heatmap generation settings such as the frequency with which heatmap data should be generated and/or specific time periods over which heatmap data should be generated. Other system settings may include pin size selection data for selecting the resolution with which pin locations are calculated indicating common standing points (this is discussed in more detail below).

A more detailed description of the operation of the system is provided with reference to the flow charts depicted in FIGS. 2, 3, 5 and 6.

As can be seen from FIG. 1, the data processing module 110 running on the analytics platform 105 comprises a data logging function 113. This data logging function 113 is configured to perform a data logging algorithm in which data retrieved by the data logger script 108 and communicated to the analytics platform 105 is logged and stored as pre-processed data in such a manner that it can be efficiently converted to heatmap data which can then be served as web data by the dashboard web server application 111 for display on an interface rendered on the analyst web application 109.

FIG. 2 provides a flow diagram depicting steps of the data logging algorithm for generating the pre-processed data.

At a first step S201, the data logging function 113 is configured to receive a gaze datapoint comprising scene matrix data and camera matrix data retrieved by the data logger script 108 relating to the view rendered of the 3D environment on a given user device during a given sample period and during a particular user session.

At a second step S202, the data logging function 113 generates an inverse of the scene matrix data.

At a third step S203, the data logging function 113 multiplies the camera matrix data with the inverse of the scene matrix data generated at the second step S202.

This process essentially "subtracts" the camera's position from the scene's position, while also accounting for changes in scale and rotation. This results in a single camera-relative-to-scene matrix indicative of a "camera position" relative to the scene.

The step of deriving a single camera-relative-to-scene matrix then extracting from this a camera position value and a camera rotation values is particularly advantageous because it obviates any requirement to perform complex and computationally burdensome processing with respect to a "world" frame of reference if the position, scale and rotation of the 3D environment changes (for example if the user shrinks in size to enter a mousehole or the scale of the environment changes as a user takes off from a planet in rocket). Moreover, only requires two variables need be stored (camera position and rotation) which is computationally efficient and reduces memory requirements.

At a fourth step S204, the data logging function 113 extracts camera position coordinates and rotation coordinates from the camera-relative-to-scene matrix.

At a fifth step S205, the camera position coordinates and rotation coordinates values are stored as a viewpoint descriptor data point in the pre-processed data database 112. This process is repeated every time a gaze datapoint data sample is received, and a dataset of viewpoint descriptor data points are stored in the pre-processed data database 112.

Typically, the data logging algorithm runs continuously as users interact with the 3D environment.

Typically, this pre-processed data is also stored with session identifier data, enabling viewpoint descriptor data points to be filtered for specific user sessions as is described in more detail below.

Periodically, the heatmap generating function 114 runs to generate heatmap data from the dataset of viewpoint descriptor datapoints stored in the pre-processed data database 112.

As will be understood, this period can be set based on factors such as the amount of data being processed, resource availability and the frequency with which heatmaps need to be updated. In a typical example, the heatmap generating function may run every 6 hours.

FIG. 3 provides a flow diagram depicting steps of the heatmap generating algorithm performed by the heatmap generating function 114.

At a first step S301, if necessary, for example if specified by the analyst during the configuration phase, one or more filters (filtering criteria) are applied to the dataset of viewpoint descriptor datapoints stored in the pre-processed data database 112.

Such filters could filter the dataset for criteria derived from the ancillary data (e.g. user device characteristic criteria such as geolocation, device type; and/or user profile information such as user age, gender etc). Additionally, or alternatively, the dataset can be filtered for other criteria such as a temporal criteria such as date range (e.g. relating to datapoints captured within a certain specific time period).

The filtered dataset of viewpoint descriptor data points is then retrieved from the pre-processed data database 112.

In certain examples, at a second step S302, the filtered dataset is divided into subsets of a predetermined number of viewpoint descriptor data points. In one example, the filtered dataset is divided in subsets of 100,000 viewpoint descriptor data points.

Dividing the filtered dataset into subsets of predetermined maximum number of gaze datapoints (for example 100,000) is a convenient way of managing any computational limits within the data processing module 110. Moreover, each subset can be run on a separate computing thread (if available) facilitating faster processing.

At a third step S303, a template heatmap of the 3D environment is initialised. This template heatmap comprises a predetermined number of heatmap points initially distributed across all surfaces of the 3D environment in accordance with an initial distribution pattern, each heatmap point with an initial weighting value w of zero.

The initial distribution pattern of the heatmap points can comprise any suitable distribution, for example, a geometrically even distribution or a random distribution.

Typically, the predetermined number of heatmap points is selected to balance computational efficiency with providing a satisfactory degree of resolution. Considering factors such as user experience, precision requirements, and performance limits, it has been found that setting 1000 heatmap points strikes a good balance. This number accounts for the user's cognitive limits in processing high-priority areas, the potential largeness of notable zones, and the technical needs for fast loading and processing on webpages. However, depending on the specific application and its unique demands, other values may also be suitable.

At a fourth step S304, a viewpoint descriptor data point from a first subset is retrieved.

At a fifth step S305, the camera position coordinates and rotation coordinates of this viewpoint descriptor data point are used to generate a user view vector which is used, in conjunction with data providing a representation of the 3D environment, to determine a gaze-scene intersection point on the surface of the 3D environment where the user is "looking".

At a sixth step S306, the heatmap point of the initialised heatmap that is closest in the 3D space to the gaze-scene intersection point is identified.

At a seventh step S307, the coordinates of the identified heatmap point are modified so the position of the heatmap point on the surface of the 3D environment more closely matches the location of the gaze-scene intersection point. This is typically achieved by shifting the heatmap point to be closer by a predetermined spatial increment towards the gaze-scene intersection point.

At an eighth step S308, a weighting value w of the identified heatmap point is incremented by 1.

At a ninth step S309, this process is iteratively repeated until each datapoint of the dataset has been used to modify the heatmap data.

At a tenth step S310, the final version of the heatmap data is stored in the processed interface data database 115 ready to be served to the analyst web application 109.

Typically, because there are only a fixed number of heatmap points (e.g. 1000), only that number of datapoints are ever saved and communicated to the analyst web application 109. These datapoints can be saved in any suitable format, but typically are saved as JSON files with x, y, z coordinates and w weights. In some examples, the weights are normalised by a shader algorithm so that the largest w has a value of 1 and the smallest w has a value of 0.

As will be understood, after this process is complete, the original heatmap template will have been transformed so that the weight value w of each heatmap point will be greater, the more times it has been shifted, corresponding to the more times the area within which it is located has been looked at. Accordingly, the weight value w can be used to control a visual property, such as shading intensity, when the heatmap is rendered on the interface.

Moreover, due to the position shifting described above, heatmap points will cluster around common gaze-intersection points, this clustering being more dense, the more a particular area of the surface of the 3D environment is "looked at".

The dashboard web server application 111 is configured to serve web page data to the analyst web application 109, providing an interface through which metrics associated with users interacting with 3D environments can be viewed. This includes the display of a heatmap in a manner that allows the user of the analyst device 104 to comprehend which areas of the 3D environment users are most frequently observing. The interface typically allows the user of the analyst device to navigate around the representation of the 3D environment, for example, to pan up and down and "zoom in" on particular areas.

In particular, the web page data served by dashboard web server application 111 comprises heatmap data generated as previously described (communicated for example, as a JSON file comprising 1000 x, y, z coordinates with associated "w" weight values), along with 3D object data containing a representation of the 3D environment.

The web page data is communicated to the analyst web application 109, which subsequently renders and presents the heatmap data and the 3D object data in a way that superimposes the heatmap data onto the 3D environment.

The heatmap is displayed in the analyst device 104 in such a manner that the shading intensity of the heatmap in the immediate vicinity of a given heatmap point corresponds to the magnitude of the 'w' value associated with that point. Consequently, it is readily, and intuitively evident which areas of the 3D environment are observed most frequently and to what extent.

Figure 4:
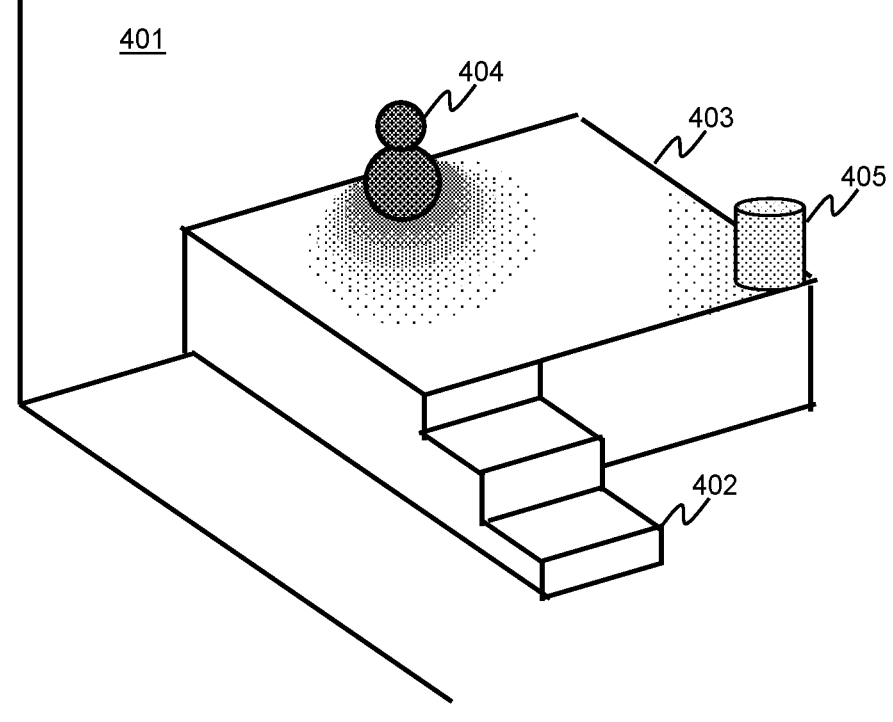
FIG. 4 provides a diagram depicting a representation of a gaze heatmap generated in accordance with certain embodiments of the invention.

A simple representative example of this is shown in FIG. 4. FIG. 4 shows a simple 3D environment 401 which in this case comprises stairs 402 leading to a stage 403, at the back of which is located a first object 404 and at one corner of which is located a second object 405.

As can be seen from FIG. 4, shading of the first object 404 and the immediate vicinity around the base of the first object 404 have a high degree of shading indicating this is an area of the 3D environment 401 at which users direct their gaze with a high occurrence.

As can also be seen from FIG. 4, the degree of shading diminishes, the further from the immediate vicinity of first object 404, indicating a decrease in the occurrence of users directing their gaze towards these more distant areas.

FIG. 4 also shows the second object 405 with a lower degree of shading than the first object 404 indicating a lower occurrence of users directing their gaze at the second object 405 than at the first object 404.

As will be understood, it could be immediately inferred from the graphical presentation of information that, for example, the first object 404 is of more interest to users than the second object 405 and any other area of the 3D environment 401.

Typically, the analyst web application 109 displays the heatmap superimposed on the representation of the 3D environment as a manipulatable 3D object for the user of the analyst device 104. For instance, the user can navigate around the 3D environment, zoom in and out to focus on specific regions of interest.

As described above, in certain examples, the heatmap generating algorithm processes subsets of view descriptor datapoints comprising a maximum number of viewpoint descriptor datapoints (for example, 100,000 datapoints). However, in certain cases, it may be desirable to generate heatmap data derived from a larger number of datapoints, for example a larger number of datapoints captured over a prolonged period of time.

In order to achieve this, whilst maintaining a maximum number of viewpoint descriptor points processed by the heatmap generating algorithm at any time, in certain examples, the heatmap generating function 114 is further configured to perform a heatmap merging algorithm in which two or more set of heatmap data are merged.

FIG. 5 provides a flow diagram depicting steps of a heatmap merging algorithm performed by the heatmap generating function 114.

At a first step S501, a first set of heatmap data corresponding to a first heatmap and a second set of heatmap data corresponding to a second heatmap are retrieved from the interface data storage database 115.

At a second step S502, a heatmap point from the first set of heatmap data and the most closely corresponding heatmap point from the second set of heatmap data are retrieved.

At a third step S503, the heatmap point from the second set of heatmap data is shifted along the surface of the 3D environment towards the heatmap point from the first set of heatmap data an amount proportional to the weight value "w" of the heatmap point of the first set of heatmap data.

At a fourth step S504, the weight value "w" of the heatmap point of the first set of heatmap data and the shifted heatmap point of the second set of heatmap data are combined and allocated to the heatmap point for the second set of heatmap data.

At a fifth step S505, this process is repeated until all of the heatmap points on the second set of heatmap data have been accordingly transformed.

At a sixth step S506, the second set of heatmap data, transformed accordingly, is stored as the merged heatmap data in the interface data storage database 115.

Accordingly, as the skilled person will understand, the algorithm produces a merged heatmap by taking two initial heatmaps and combining them into a single one. It does this by adjusting the position and weight values of the points on the second heatmap, using the first heatmap as a reference. Each point on the second heatmap is moved towards its closest corresponding point on the first heatmap, based on a weight value. These weight values are then combined and assigned to the adjusted points on the second heatmap. The process is repeated for all points, resulting in a new, merged heatmap that is then stored for future use.

As the skilled person will understand, if necessary, this algorithm can be sequentially repeated to merge multiple heatmaps.

In certain examples, the analytics platform 105 further comprises a pin map generating function 116 which is configured to generate "position pin" data indicative of positions within the 3D environment where users most frequently "stand"—i.e. "common standing points" where users pause moving within the 3D environment.

Figure 6:
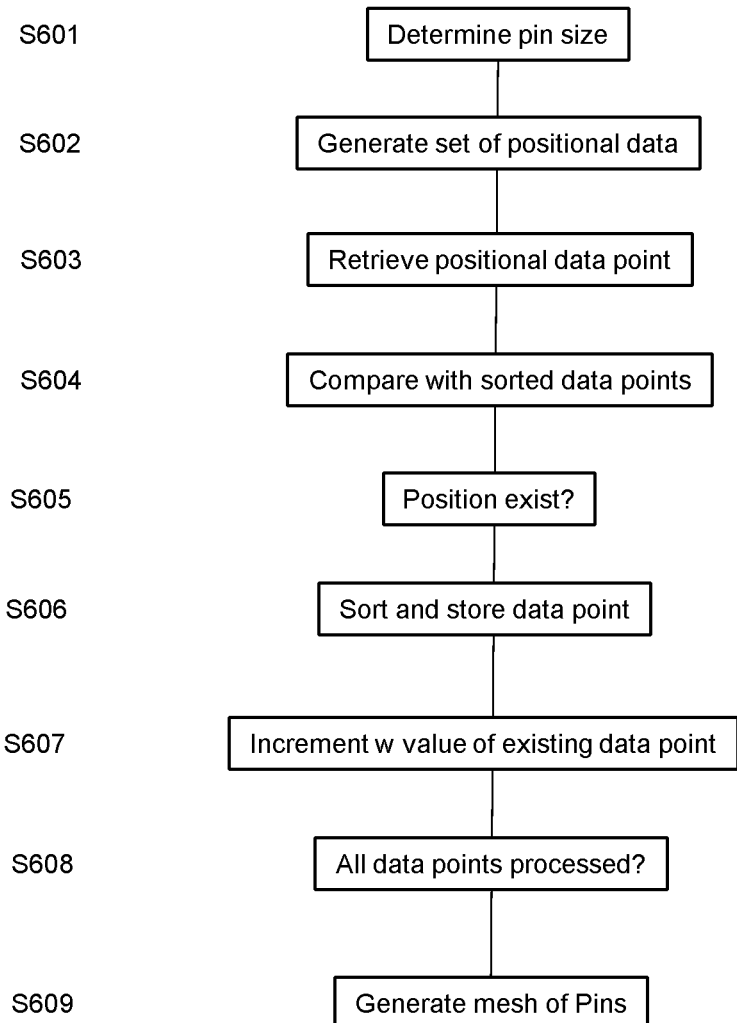
FIG. 6 provides a diagram depicting steps of a position pin generating algorithm in accordance with certain embodiments of the invention.

A position pin generating algorithm performed by the pin map generating function 116 for generating position pin data is depicted in FIG. 6.

At a first step S601, a pin size is determined. The pin size is typically selected by the analyst as part of the system initialisation process and passed to the position pin generating algorithm as pin size setting data.

Selecting the pin size enables the analyst to specify with how much 'resolution' common standing points are displayed. A smaller pin size allows for more precise identification of standing points but may lead to a cluttered display. A larger pin size offers a more general overview and reduces clutter, but may miss smaller clusters of activity. By enabling the analyst to select the pin size, the analyst can select an appropriate balance for their needs.

At a second step S602, a set of positional data is generated from a subset of datapoints, for example from one or more subsets of view descriptor datapoints generated at the second step S302 of the heatmap generating algorithm described with reference to FIG. 3.

The set of positional data, typically derived from the camera position coordinates, comprises a plurality of position data points each indicative of a position within the 3D environment where a user has paused for a predetermined period of time. Each position data point is rounded in accordance with the pin size setting data. For example, if a positional pin is 0.5 units large, then position x, y, and z coordinate data is rounded to the nearest 0.5.

At a third step S603, a position data point of the plurality of position data points, generated at the second step S602, is retrieved.

At fourth step S604, this position data point is compared with a group of sorted position data points. If this is the first position data point to be processed, the group of sorted position data points will be empty and this will be a null comparison, and the process will proceed to the sixth step, S606.

However, if position data point is a subsequent position data point, then at a fifth step S605, the value of the position data point is compared with the group of sorted position data points to determine whether or not a matching position data point (indicative of the same user standing position) has previously been processed.

If at the fifth step S605, it is determined that there is not another position data point corresponding to this data point, then the process moves to a sixth step S606 where the position data point is sorted and stored at a location within the group of sorted position data points based on its size.

However, if at the fifth step S605, it is determined that there is not another position data point corresponding to this data point, then the process moves to a sixth step S607 where identified position data point from the sorted position data points has a weight value "w" associated with it, incremented by 1. The other position data point is discarded.

At an eighth step, S608, the process repeats until all of the position data points have been added to the group of sorted position data points or used to increment the weight value "w" of a matching position data point in the group of sorted position data points.

Once all of the position data points have been sorted, at a ninth step S609, the data is then stored in the interface data storage database 115.

Mesh data providing a mesh representation of a position data pin can be defined, with a visual property, such as a shading value, corresponding to the weight value "w" of each position data point.

This mesh data can then be served as web data by the dashboard web server application 111 to the analyst web application 109 for display in the interface in a similar manner as the heatmap. In particular, each position data point can be represented by a mesh with a shading value corresponding to the weight value "w" of the position point. In this way, a plurality of common standing points can be displayed on the interface provided the analyst web application 109 with a visual indicator (e.g. shading) corresponding to how frequently users are standing in the position indicated by the location of the mesh.

Figure 7:
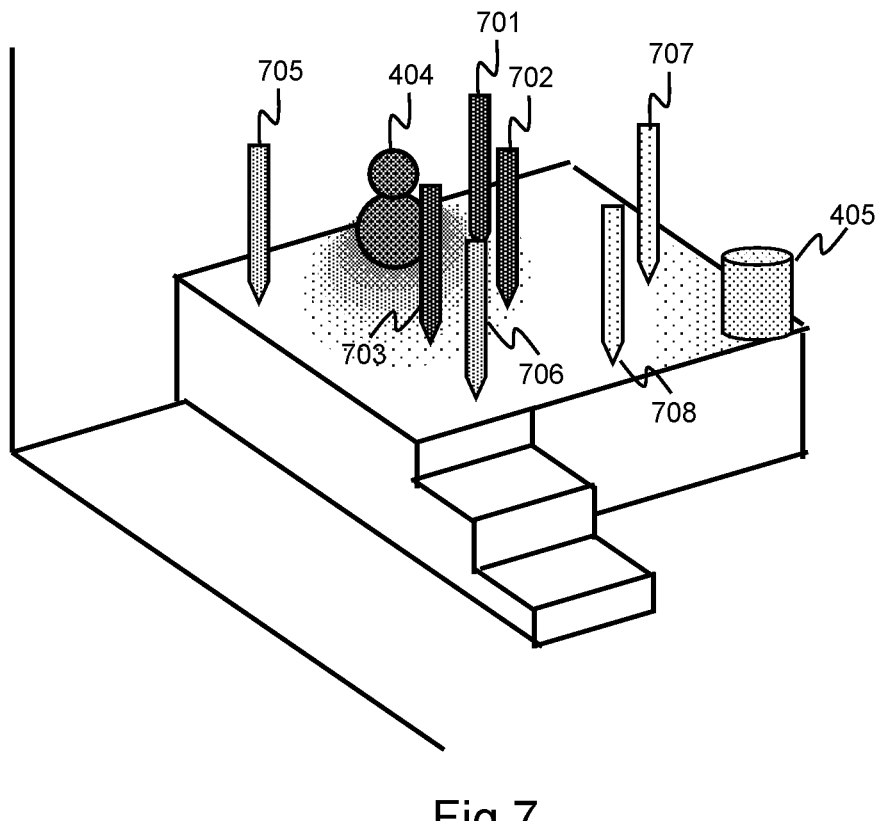
FIG. 7 depicts a representation of a gaze heatmap and a pin map generated in accordance with certain embodiments of the invention.

A simple representative example of this is shown in FIG. 7. FIG. 7 provides a depiction of the 3D environment 401 described with reference to FIG. 4 except that a plurality of pin graphical elements is shown.

FIG. 7 shows a first pin 701, second pin 702 and third pin 703 with the highest degree of shading clustered around the first object 404. A fifth pin 705 and sixth pin 706 are positioned in more peripheral positions with an intermediate degree of shading and a seventh pin 707 and an eighth pin 708 with a minimal degree of shading are clustered around the second object 405.

The graphical pin elements are thus indicative of the most common places for users to pause is in the positions indicated by the first pin 701, second pin 702 and third pin 703, the second most common place for users to pause is in the positions indicated by the fifth pin 705 and sixth pin 706 and the least most common place for users to pause is in the position indicated by the seventh pin 707 and eighth pin 708.

As will be understood, it can be inferred from this that the most view of most interest to users is found at the positions shown by the first pin 701, second pin 702 and third pin 703, and a view of lesser interest to users is found at the positions viewed from the positions indicated by the seventh pin 707 and the eighth pin 708.

The techniques for generating heatmap data and pin map data, and then displaying them on an interface can be manifested in any suitable way.

In one example, which is simple, clear and intuitive to use, the interface can be provided in the form of the dashboard web server application 111 is configured to generate web data which is communicated to the analyst web application 109 to generate an interface displayed on the analyst device 104 which takes the form of a "dashboard" comprising three tabs: a heatmap tab, a "session explorer" tab, and an "engagement metrics" tab.

A first tab displays the gaze heatmap and the pin map superimposed on the 3D environment. As described above, in this tab, the gaze heatmap is shown, highlighting areas of frequent observation in the 3D environment along with the pin map, representing common standing points, providing a visual indicator of most common user positions within the 3D environment.

Figure 8:
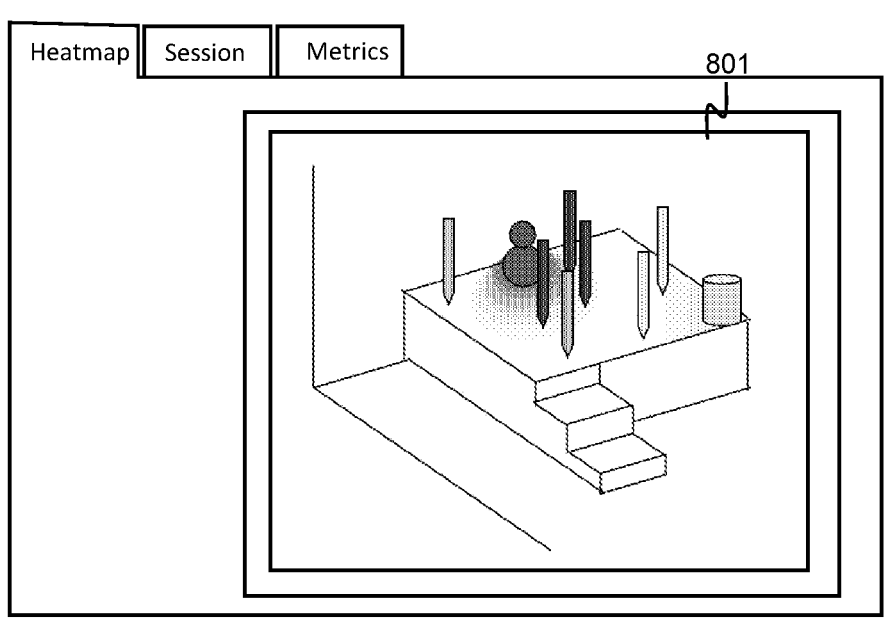
FIG. 8 provides a representation of a heatmap tab of a dashboard interface in accordance with certain embodiments of the invention.

An example representation of such a tab is shown in FIG. 8. FIG. 8 provides a schematic diagram depicting an example of a heatmap tab of an example dashboard including a display area 801 within which a gaze heatmap and pin map are rendered and shown superimposed on a representation of the 3D environment.

It will be understood that, although the example of the heatmap tab shown in FIG. 8 shows the gaze heatmap and the pin map displayed simultaneously, in typical examples a user can select to display one of these or both of these, i.e. the gaze heatmap on its own or the pin map on its own.

In certain examples, the interface, for example the heatmap tab, may be further adapted to enable the analyst to select a specific area of the 3D environment or a specific object/entity; render a representation of this area or object/entity specifically and then superimpose over this the part of the gaze heatmap relating to that entity/area. This can enable an analyst to focus on a specific object or entity and more clearly understand how users have been "looking at" that entity or object.

Figure 9:
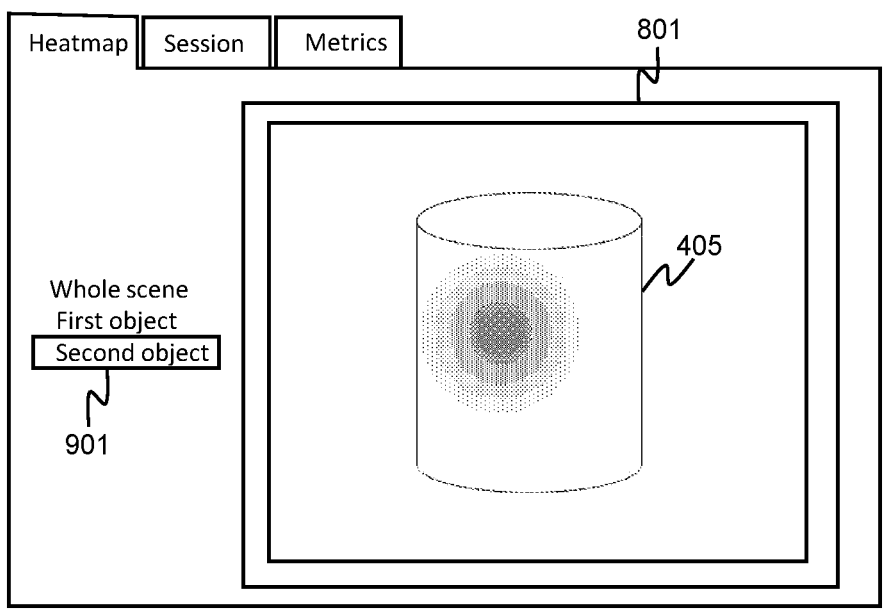
FIG. 9 provides another representation of a heatmap tab of the dashboard interface in accordance with certain embodiments of the invention.

This concept is schematically depicted in FIG. 9. FIG. 9 corresponds to the heatmap tab shown in FIG. 8, except that an entity selection control 901 has been selected, selecting the second object 405, and correspondingly, the heatmap display area 801 provides a representation of the second object 405 with other parts of the 3D environment not shown. As can be appreciated from FIG. 8, this enables, for example a more detailed depiction of parts of the gaze heatmap relating to the second object 405 to be comprehended, revealing in this example, that a region slightly offset to the left from the centre of the second object 405 is of particular interest to users.

A second tab displays a "session explorer" tab. This tab typically displays a list of user sessions (obtained from the session identifier data) and allows the analyst to select a user session. When such a selection has been made, viewpoint descriptor datapoints associated with the selected session are retrieved by the dashboard web server application 111 from the pre-processed data database 112. This is done in such a way that the retrieved data is representative of the camera position and camera rotation as it changes over time and thus indicative of a "recording" of the user session. More particularly, this is indicative of a path traversed by a user during the user session. This data retrieval can be done in any suitable way, for example based on the order in which the gaze datapoints have been received by the data logging function 113).

The session explorer tab further comprises a session playback window which includes a display of how the camera position and camera rotation change over time during the user session. As will be understood, this can be achieved in multiple ways, and in certain examples an analyst can select a particular "playback view". Examples of playback views include "first person" which can simply comprise a playback from the users view on their device, a "fixed aerial" view where the user's progress through the 3D environment is displayed from a fixed perspective as, for example a series of position points with view lines indicating where a user is directing their gaze, and a "roaming view", where the position from which the user's progress is displayed from a perspective which the analyst can change.

Typically, the session explorer tab can include playback controls including for example, a "play" control, "pause" control, "fast forward" control, "rewind" control, scrollable progress bar control and so on.

Figure 10:
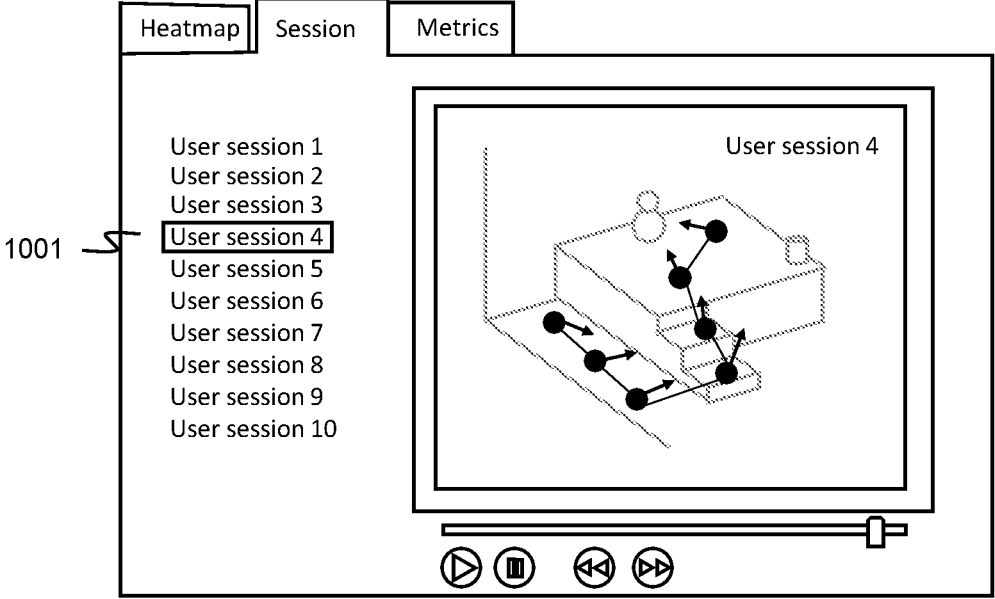
FIG. 10 provides a representation of a session explorer tab of a dashboard interface in accordance with certain embodiments of the invention.

FIG. 10 provides a schematic diagram depicting an example of a session explorer tab of an example dashboard including a display area 1001 within which playback window is displayed, playback controls 1002 are provided, and a user session selection control 1003 is provided, enabling a specific user session to be selected and played back.

The engagement metrics tab displays, typically in graphical form, data generated by the metrics data generating function 117. This displayed data, typically derived from the ancillary data and the session data, provides quantitative data indicating data how users are "engaging" with the 3D environment, for example total number of user session over a particular time period; average time duration per user session; where a 3D environment includes embedded calls to action (CTAs), (for example, prompts to interact with elements of the 3D environment such as areas or objects to select (e.g. "click" on) to "take a quiz", select a "shop" link, open a "book" object and so on), average number of CTA responses per user session; for 3D environments with multiple CTAs, and a breakdown of CTA responses per individual CTA. The engagement metrics tab may include a display of user device data such as a summary, by geolocation, of where user devices are located, a breakdown of device types, and technical information such as an indication, for example, by device type, of average frame rates during user sessions. Where the 3D environment provides a means for receiving user feedback, for example satisfaction rating surveys; this data can also be displayed in the engagement metrics tab.

Figure 11:
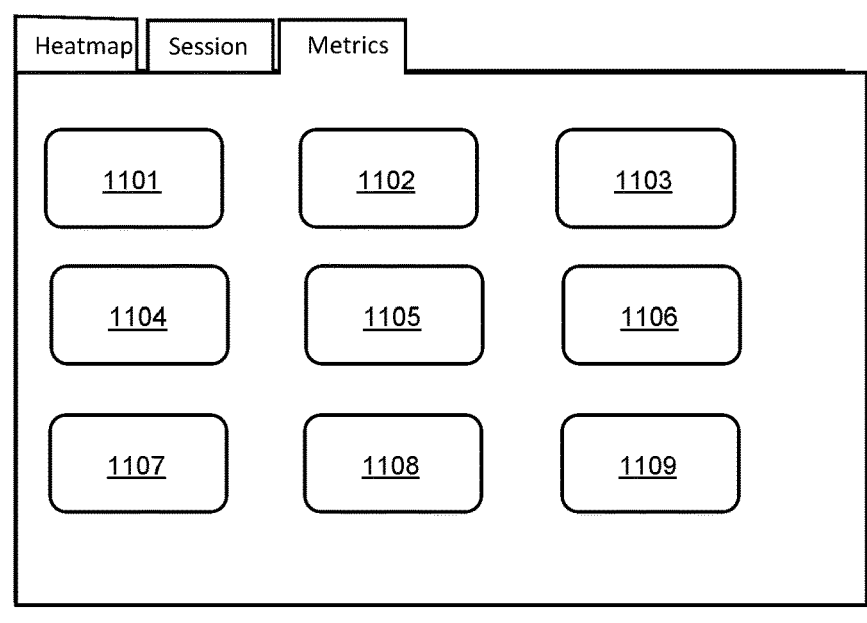
FIG. 11 provides a diagram showing a representation of a metrics tab of a dashboard interface in accordance with certain embodiments of the invention, and FIG. 12 provides a simplified schematic diagram depicting an example implementation of a system arranged in accordance with certain embodiments of the invention.

An example representation of such a tab is shown in FIG. 11. As can be seen from FIG. 11, the tab comprises a plurality of "tiles" 1101-1109 where metrics of the type described above can be displayed.

In certain examples, further engagement metrics can be graphically displayed on, for example, the engagement metrics tab. For example, the metrics data generating function 117 can be configured to calculate "proportion-of-environment-observed" metric data, and "proportion-of-environment-traversed" metric data.

The proportion-of-environment-observed metric data is indicative of the proportion of a 3D environment that has been observed during a given user session (i.e. the proportion of a 3D environment at which a user has directed their gaze). Similarly, the proportion-of-environment-traversed metric data is indicative of what proportion of the 3D environment a user has navigated around.

To calculate these metrics, the metrics data generating function 117 can retrieve relevant viewpoint descriptor data from the pre-processed data database 112 and on a user session by user session basis, perform suitable algorithms to determine for each relevant user session, a proportion-of-environment-observed value (for example as a percentage value), and a proportion-of-environment-traversed value.

As described above, in typical examples, the ancillary data received by the data processing module 110 includes further information about the user devices (such as type and geolocation) and further information about the users of these devices (including, for example, demographic information such as age and gender). In typical examples, the tabs forming the interface are provided with filter controls which enable the analyst to filter on this basis so that data can be selectively displayed relating, for example, to user devices and/or users with particular characteristics. An example might be setting these philtre controls so that data is only displayed for user sessions relating to user device that are located in Western Europe and being used by users who are female and over the age of 25.

As the skilled person will understand, the system 101 depicted in FIG. 1 can be implemented in any suitable way. An exemplary implementation is shown in FIG. 12.

Figure 12:
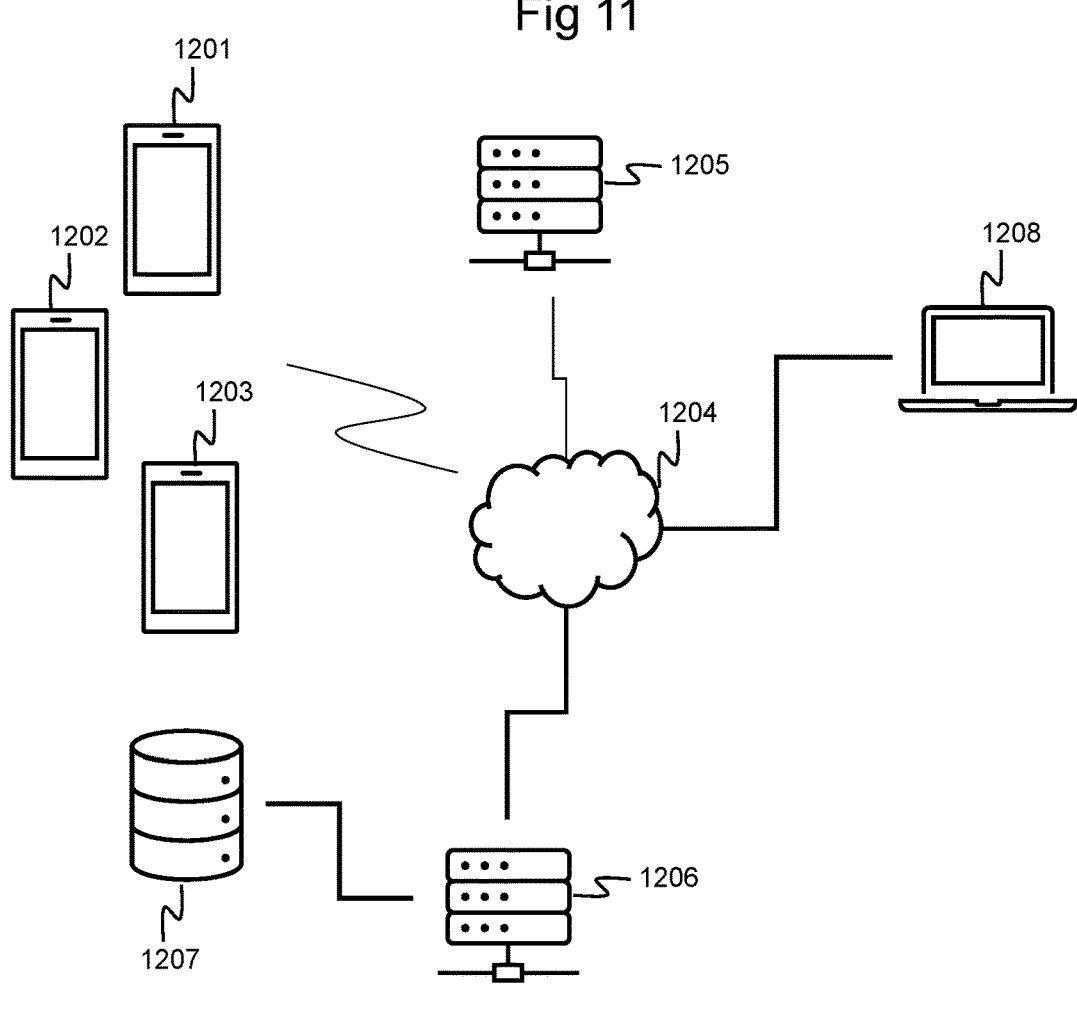

FIG. 12 provides a simplified schematic diagram depicting a plurality of user devices 1201, 1202, 1203, provided by devices such as personal computers, smartphones, tablets, and similar devices, which are connected via a data network 1204, typically provided by the Internet. The user devices 1201, 1202, 1203 are connected to the first application server system 1205 via the data network 1204.

The user devices 1201, 1202, 1203 are communicatively connected to the data network 1204 in any suitable way. For example, the user devices 1201, 1202, 1203 may be connected to the data network 1204 using various communication methods including, but not limited to, Wi-Fi, Ethernet, cellular networks (such as 4G LTE or 5G), Bluetooth, satellite communication, and near-field communication (NFC).

The user devices 1201, 1202, 1203 have running thereon the user web application 106, typically provided by a suitable web browser software capable of rendering the 3D environment as described above.

The first application server system 1205 has running thereon software providing the 3D content delivery web application 107, and on which the data logger script 108 is running. The 3D content delivery web application 107 can include any suitable software for providing 3D data to the web browsers running on the user devices 1201, 1202, 1203. Examples include but are not limited to, 8th Wall, A-Frame, ARCore, ARKit, Decentraland, Three.js, Unity, and Unreal Engine.

The system further comprises a second application server system 1206 that has running thereon software providing the data processing module 110 and the dashboard web server application 111.

As the skilled person will understand, the first application server system 1205 and second application server system 1206 can be implemented in any suitable way. Examples of such implementations include software running on one or more dedicated servers in a conventional fixed sense, where each server hosts and runs the software independently. Alternatively, implementations may utilise cloud computing solutions, where the software is hosted on a network of virtual servers provided by cloud service providers, offering scalability and flexibility. Additionally, serverless environments, such as Amazon Lambda, can be used, where the server management and capacity planning decisions are abstracted away from the user, allowing the software to be executed without dedicated server infrastructure.

Connected to the second application server system 1206 is a server system 1207 on which the pre-processed data database 112 and processed interface data database 115 are implemented, along with any other database requirements of the system. As will be understood by the skilled person, the second application server system 1206 can implement these databases in any suitable way, for example, Examples of appropriate database technologies include, but are not limited to, relational database management systems (RDBMS) like MySQL, PostgreSQL, and Oracle Database; NoSQL databases such as MongoDB, Cassandra, and Couchbase; and in-memory databases like Redis and Memcached. Additionally, cloud-based database services such as Amazon RDS (Relational Database Service), Google Cloud SQL, and Azure SQL Database can also be used.

FIG. 12 also shows an analyst device 1208 connected to the second application server system 1206 via the data network 1204, on which the analyst web application 109 is running. The analyst web application is typically provided by web browser software capable of rendering the dashboard generated by the dashboard web server application 111.

The web browser software running on the user devices 1201, 1202, 1203, and on the analyst device 1208 can be provided by any suitable web browser software. The web browser software running on the user devices 1201, 1202, 1203, and on the analyst device 1208 can be provided by any suitable web browser software. Examples of suitable web browser software capable of supporting the necessary technology for rendering 3D environments include, Chrome, developed by Google; Safari, developed by Apple; Firefox, developed by Mozilla; and Microsoft Edge, developed by Microsoft.

In the examples described above, the data processing module 110 runs on an analytics platform 105 provided for example by an application server system 1206 which serves data to a remote device (the analyst device 104) using the dashboard web server application 111.

However, in alternative implementations, the data processing module and other related functionality including the data storage provided by the pre-processed data database 112 and the processed interface data database 115 can be incorporated in an analyst device or analyst computer system. In other words, the functionality provided by the data processing module 110 can be incorporated within the same computer device or computer system that generates the analyst interface.

In the examples described above, the interface is rendered using a web application (the analyst web application 109) such as an otherwise conventional web browser running on the analyst device and therefore a web server application (the dashboard web server application 111) is used to generate and communicate web data to the analyst device 104. However, in alternative embodiments, the software running on the analyst device 104 which provides the interface may be provided by alternative means (for example a native mobile or desktop application) and therefore, rather than a web server application, the functionality that communicate the interface data to the analyst device 104 may be an alternative data communication application (for example a server application transmitting raw data formats such as JSON or CSV).

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent, or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. A method of generating an analytics display indicative of user interaction with a 3D environment, said method comprising:
  receiving gaze data indicative of surface locations within a common 3D environment rendered on a plurality of user devices, said gaze data indicative of where users direct their gaze within the 3D environment;
  periodically generating heatmap data from the gaze data, said heatmap data comprising a plurality of heatmap points corresponding to surface locations within the 3D environment, each heatmap point weighted corresponding to a frequency with which users direct their gaze at the surface location to which the heatmap point corresponds;
  communicating the heatmap data to a further device, and
  rendering at the further device the heatmap data as a 3D heatmap superimposed on a representation of the 3D environment, thereby generating a 3D interactive display indicative of the surface locations within the 3D environment at which the users most commonly direct their gaze,
  wherein:
    the gaze data comprises a plurality of gaze datapoints, each gaze datapoint indicative of a surface location within the common 3D environment at which a user has directed their gaze during a sample period; and
    generating the heatmap data comprises:
      processing the gaze data to calculate a plurality of intersection points indicative of where a user gaze intersects with a surface of the 3D environment;
      transforming, in accordance with positions of the plurality of intersection points, a heatmap template comprising a plurality of heatmap points representative of the surface of the 3D environment and initially distributed in accordance with an initial distribution pattern, and
      generating the heatmap data from the transformed heatmap template.

2. A method according to claim 1, wherein the initial distribution pattern comprises a substantially even distribution of the plurality of heatmap points across the surface of the 3D environment.

3. A method according to claim 2, wherein a number of heatmap points is a predetermined number of heatmap points set independently of properties of the surface of the 3D environment.

4. A method according to claim 3, wherein transforming the heatmap template in accordance with the positions of the plurality of intersection points comprises sequentially, for each intersection point:
  identifying a heatmap point of the heatmap template which most closely matches the position of the intersection point, and
  incrementing a weighting value of the identified heatmap point.

5. A method according to claim 4, wherein transforming the heatmap template in accordance with the positions of the plurality of intersection points further comprises sequentially, for each intersection point:
  modifying the location of the identified heatmap point to match more closely the location of the intersection point.

6. A method according to claim 1, wherein each gaze datapoint comprises scene matrix data indicative of a position, rotation and scale of the 3D environment relative to a world reference frame, and camera matrix data indicative of a position, rotation and scale of a user view relative to the world reference frame, wherein calculating the plurality of intersection points comprises, for each gaze datapoint:
  multiplying the camera matrix data with an inverse of the scene matrix data to obtain a camera-relative-to-scene matrix indicative of a position, rotation and scale of the users view relative to the scene;
  extracting from the camera-relative-to-scene matrix camera position coordinates and camera rotation coordinates;
  generating from the camera position coordinates and camera rotation coordinates, a user view vector; and
  calculating an intersection point from the user view vector and a representation of the 3D environment.

7. A method according to claim 1, wherein periodically generating heatmap data from the gaze data comprises:
  generating a first set of heatmap data from a first set of gaze data;
  generating one or more further sets of heatmap data from one or more further sets of gaze data;
  merging the first set of heatmap data and one or more further sets of heatmap data to produce merged heatmap data, and
  the heatmap data communicated to the further device is the merged heatmap data.

8. A method according to claim 7, wherein the first set of gaze data and the one or more further sets of gaze data each comprise a predetermined maximum number of gaze datapoints.

9. A method according to claim 1, further comprising:
  filtering the gaze data in accordance with a filtering criteria, and
  periodically generating the heatmap data from the filtered gaze data.

10. A method according to claim 9, wherein the filtering criteria is one or more of a user device characteristic criteria associated with one or more characteristics of a user device from which the gaze data was received, and a temporal criteria associated with a point in time when the gaze data was received.

11. A method according to claim 1, wherein the gaze data is received from a logger script running on a system serving 3D data to the user devices for displaying the 3D environment.

12. A method according to claim 1, wherein the heatmap data is communicated to the further device as web data to be rendered on the further device by web browser software running on the further device.

13. A method according to claim 1, wherein rendering the heatmap data at the further device comprises:

displaying each heatmap point with a visual property dependent on its weighting.

14. A method according to claim 13, wherein the visual property is shading intensity.

15. A method according to claim 1, wherein the gaze data is further indicative of locations within the 3D environment where users have paused, and said method further comprises:

periodically generating pin map data indicative of locations where users have most commonly paused;

communicating the pin map data to the further device, and further rendering the pin map data at the further device as a 3D map of distributed graphical pins superimposed on the representation of the 3D environment, thereby generating a 3D interactive display indicative of the locations within the 3D environment at which users most commonly pause.

16. A method according to claim 1, wherein the gaze data is further indicative of a path traversed by the users within the 3D environment, said method further comprising:

communicating the gaze data associated with the path traversed by a selected user to the further device, and rendering a representation of the path at the further device.

17. A method according to claim 1 further comprising:

receiving ancillary data associated with characteristics of the plurality of user devices and users of the plurality of user devices;

communicating the ancillary data to the further device, and displaying metric data associated the ancillary data at the further device.

18. A method according to claim 1, further comprising:

receiving entity selection data at the further device identifying an entity within the 3D environment, and further selectively rendering parts of the heatmap data associated with identified entity superimposed on a representation of the entity thereby generating a further 3D interactive display indicative of surface locations of the entity at which the users most commonly direct their gaze.

19. A system for generating an analytics display indicative of user interaction with a common 3D environment, said system comprising a first computer system on which is running a data processing module and a further computing device comprising a display, wherein said data processing module is configured to control the first computer system to:

receive gaze data indicative of surface locations within the common 3D environment rendered on a plurality of user devices, said gaze data indicative of where users of the plurality of user devices direct their gaze within the common 3D environment;

periodically generate heatmap data from the gaze data, said heatmap data comprising a plurality of heatmap points corresponding to surface locations within the common 3D environment, each heatmap point weighted corresponding to a frequency with which users direct their gaze at the surface location to which the heatmap point corresponds, and;

communicate the heatmap data to the further device, whereupon, a display rendering function running on the further computer device is configured to:

render on the display the heatmap data as a 3D heatmap superimposed on a representation of the common 3D environment, thereby generating a 3D interactive display indicative of the surface locations within the common 3D environment at which the users most commonly direct their gaze, wherein:

the gaze data comprises a plurality of gaze datapoints, each gaze datapoint indicative of a surface location within the common 3D environment at which a user has directed their gaze during a sample period; and the data processing module is configured to control the first computer system to generate the heatmap data by:

processing the gaze data to calculate a plurality of intersection points indicative of where a user gaze intersects with a surface of the 3D environment;

transforming, in accordance with positions of the plurality of intersection points, a heatmap template comprising a plurality of heatmap points representative of the surface of the 3D environment and initially distributed in accordance with an initial distribution pattern, and generating the heatmap data from the transformed heatmap template.

20. A system according to claim 19, wherein the initial distribution pattern comprises a substantially even distribution of the plurality of heatmap points across the surface of the 3D environment.

21. A system according to claim 20, wherein a number of heatmap points is a predetermined number of heatmap points set independently of properties of the surface of the 3D environment.

22. A system according to claim 21, wherein the data processing module is configured to control the first computer system to transform the heatmap template in accordance with the positions of the plurality of intersection points by sequentially, for each intersection point:

identifying a heatmap point of the heatmap template which most closely matches the position of the intersection point, and incrementing a weighting value of the identified heatmap point.

23. A system according to claim 22, wherein transforming the heatmap template in accordance with the positions of the plurality of intersection points further comprises sequentially, for each intersection point:

modifying the location of the identified heatmap point to match more closely the location of the intersection point.

24. A system according to claim 19, wherein each gaze datapoint comprises scene matrix data indicative of a position, rotation and scale of the 3D environment relative to a world reference frame, and camera matrix data indicative of a position, rotation and scale of a user view relative to the world reference frame, wherein the data processing module is configured to control the first computer system to calculate the plurality of intersection points by, for each gaze datapoint:

multiplying the camera matrix data with an inverse of the scene matrix data to obtain a camera-relative-to-scene matrix indicative of a position, rotation and scale of the users view relative to the scene;

extracting from the camera-relative-to-scene matrix camera position coordinates and camera rotation coordinates;

generating from the camera position coordinates and camera rotation coordinates, a user view vector, and calculating an intersection point from the user view vector and a representation of the 3D environment.

25. A system according to claim 19, wherein the data processing module is configured to control the first computer system to periodically generate heatmap data from the gaze data by:

generating a first set of heatmap data from a first set of gaze data;

generating one or more further sets of heatmap data from one or more further sets of gaze data;

merging the first set of heatmap data and one or more further sets of heatmap data to produce merged heatmap data, and the heatmap data communicated to the further device is the merged heatmap data.

26. A system according to claim 25, wherein the first set of gaze data and the one or more further sets of gaze data each comprise a predetermined maximum number of gaze datapoints.

27. A system according to claim 19, wherein the data processing module is further configured to control the first computer system to:

filter the gaze data in accordance with a filtering criteria, and periodically generate the heatmap data from the filtered gaze data.

28. A system according to claim 27, wherein the filtering criteria is one or more of a user device characteristic criteria associated with one or more characteristics of a user device from which the gaze data was received, and a temporal criteria associated with a point in time when the gaze data was received.

29. A system according to claim 19, wherein the first computer system is configured to receive the gaze data from a logger script running on a system serving 3D data to the user devices for displaying the 3D environment.

30. A system according to claim 19, wherein the first computer system has running thereon a web server application configured to communicate the heatmap data to the further device as web data to be rendered on the further device by web browser software running on the further device.

31. A system according to claim 19, wherein rendering at the further device the heatmap data comprises displaying each heatmap point with a visual property dependent on its weighting.

32. A system according to claim 31, wherein the visual property is shading intensity.

33. A system according to claim 19, wherein the gaze data is further indicative of locations within the 3D environment where users have paused, and said data processing module is further configured to control the first computer system to:

periodically generate pin map data indicative of locations where users have most commonly paused;

communicate the pin map data to the further device, and the further device is configured to further render the pin map data as a 3D map of distributed graphical pins superimposed on the representation of the 3D environment, thereby generating a 3D interactive display indicative of the locations within the 3D environment at which users most commonly pause.

34. A system according to claim 19, wherein the gaze data is further indicative of a path traversed by the users within the 3D environment, wherein the data processing module is configured to control the first computer system to:

communicate the gaze data associated with the path traversed by a selected user to the further device, and responsive to which said further device is configured to render a representation of the path.

35. A system according to claim 19 wherein the first computing system is configured to further receive ancillary data associated with characteristics of the plurality of users devices and users of the plurality of user devices, and the data processing module is configured to control the first computer system to communicate the ancillary data to the further device, whereupon, the further device is configured to display metric data associated the ancillary data on the display.

36. A computer program which when run on a computing device, controls the computing device to perform a method comprising the steps of:

receiving gaze data indicative of surface locations within a common 3D environment rendered on a plurality of user devices, said gaze data indicative of where users direct their gaze within the 3D environment;

periodically generating heatmap data from the gaze data, said heatmap data comprising a plurality of heatmap points corresponding to surface locations within the 3D environment, each heatmap point weighted corresponding to a frequency with which users direct their gaze at the surface location to which the heatmap point corresponds, and communicating the heatmap data to a further device, such that the heatmap data can be rendered at the further device as a 3D heatmap superimposed on a representation of the 3D environment, thereby generating a 3D interactive display indicative of the surface locations within the 3D environment at which the users most commonly direct their gaze, wherein:

the gaze data comprises a plurality of gaze datapoints, each gaze datapoint indicative of a surface location within the common 3D environment at which a user has directed their gaze during a sample period; and generating the heatmap data comprises:

processing the gaze data to calculate a plurality of intersection points indicative of where a user gaze intersects with a surface of the 3D environment;

transforming, in accordance with positions of the plurality of intersection points, a heatmap template comprising a plurality of heatmap points representative of the surface of the 3D environment and initially distributed in accordance with an initial distribution pattern, and generating the heatmap data from the transformed heatmap template.

* * * * *